Figure 5:
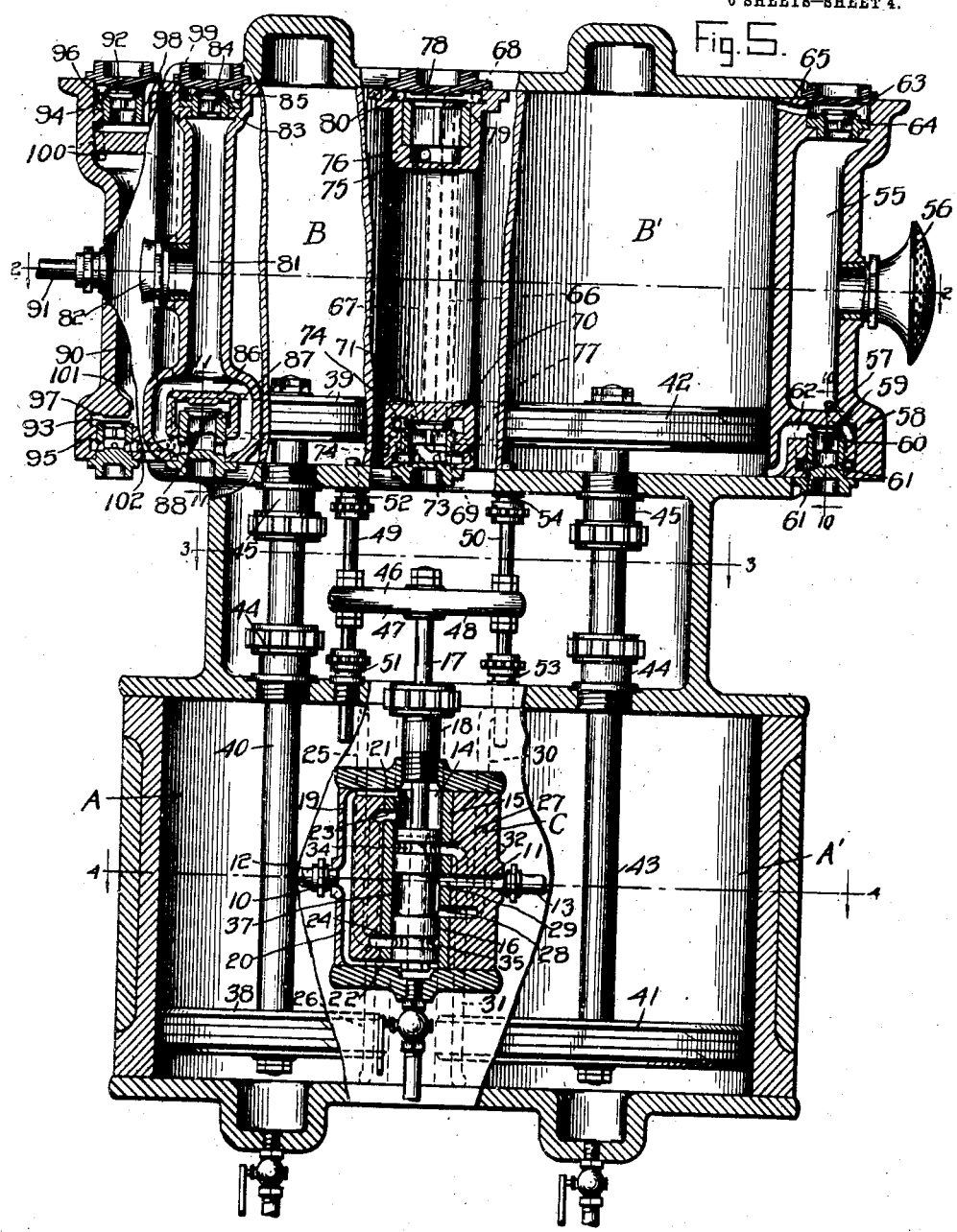

F. TUMA.
COMPOUND PUMP.
APPLICATION FILED APR. 8, 1912.
1,039,616.
Patented Sept. 24, 1912.
6 SHEETS—SHEET 1.
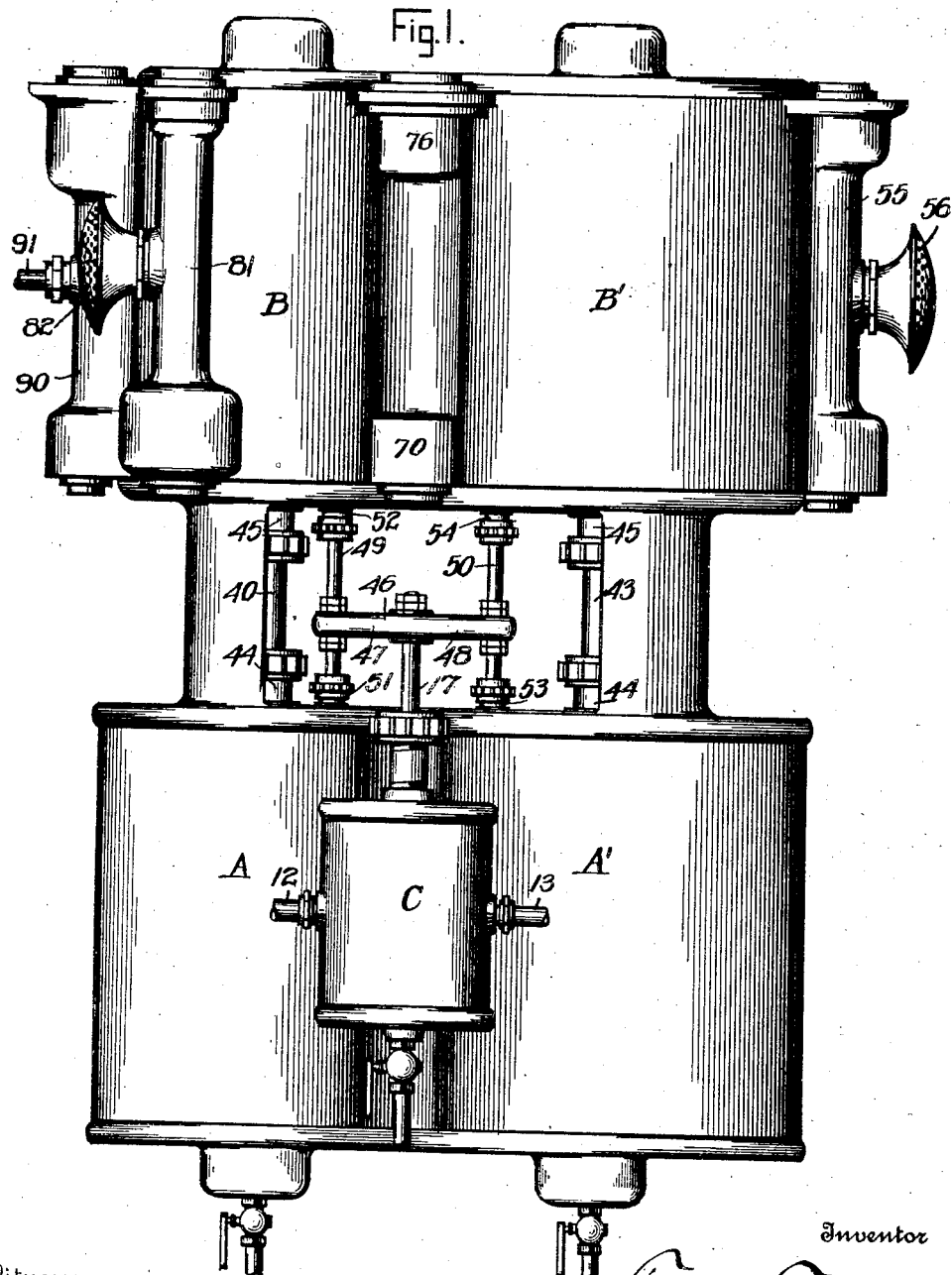

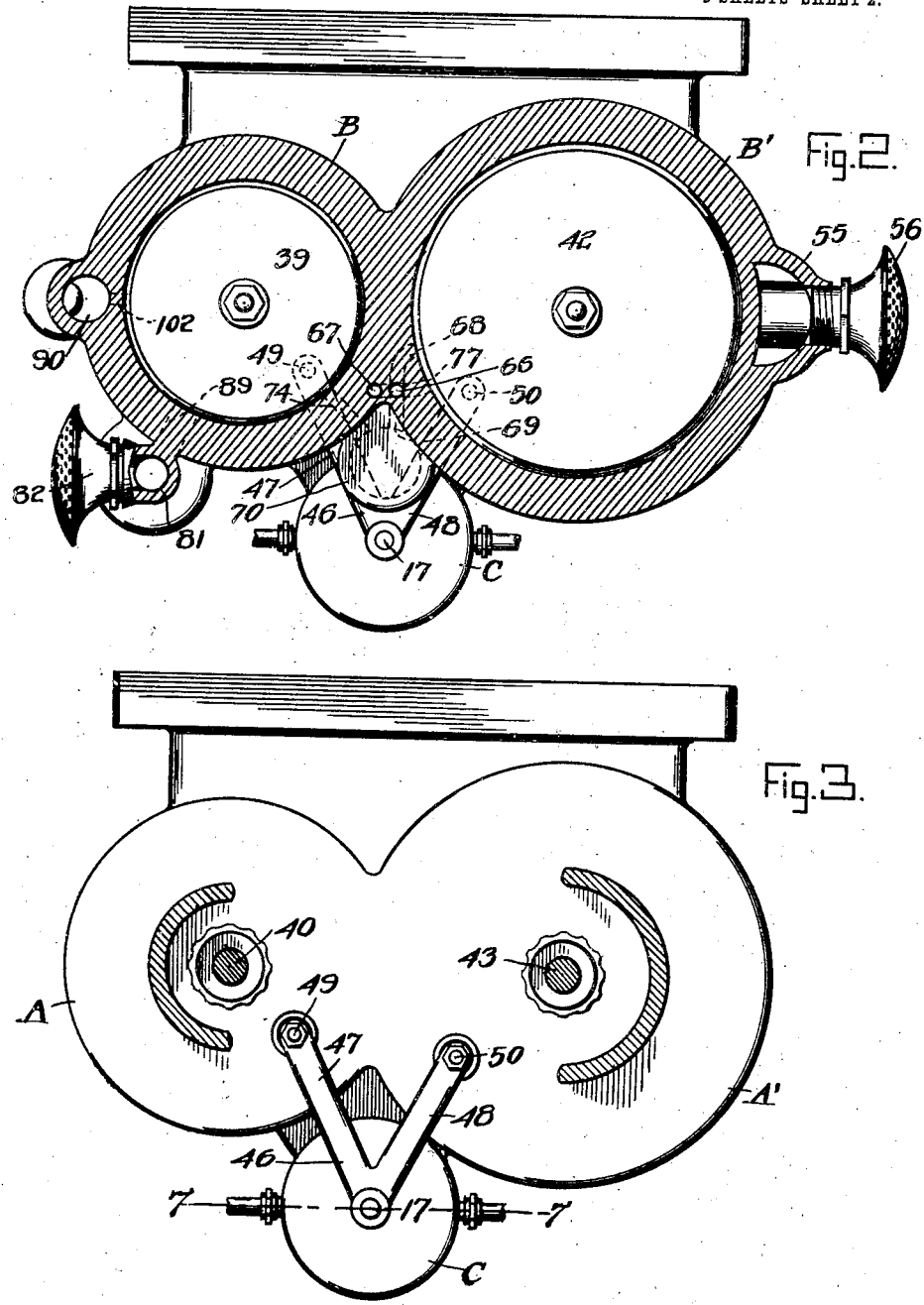

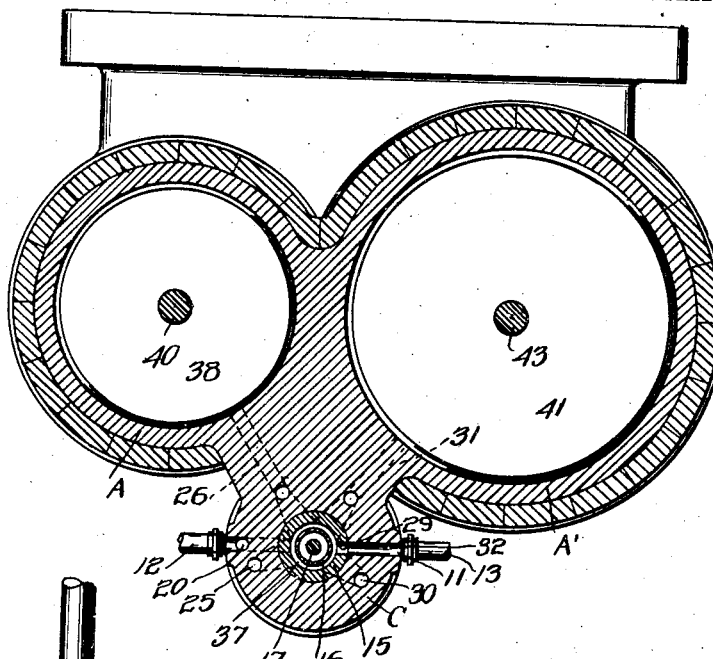
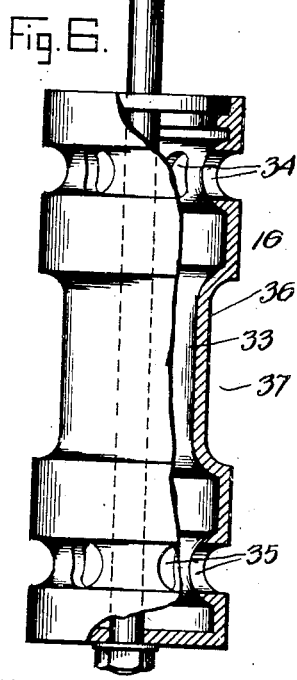
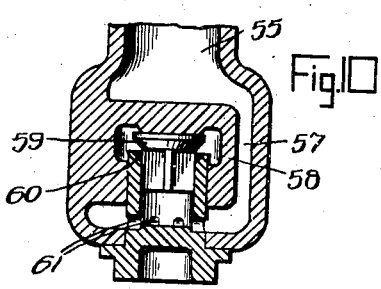
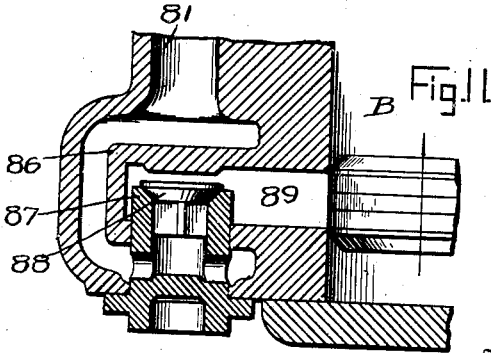

F. TUMA.
COMPOUND PUMP.
APPLICATION FILED APR. 8, 1912.

1,039,616.

Patented Sept. 24, 1912.
6 SHEETS—SHEET 4.

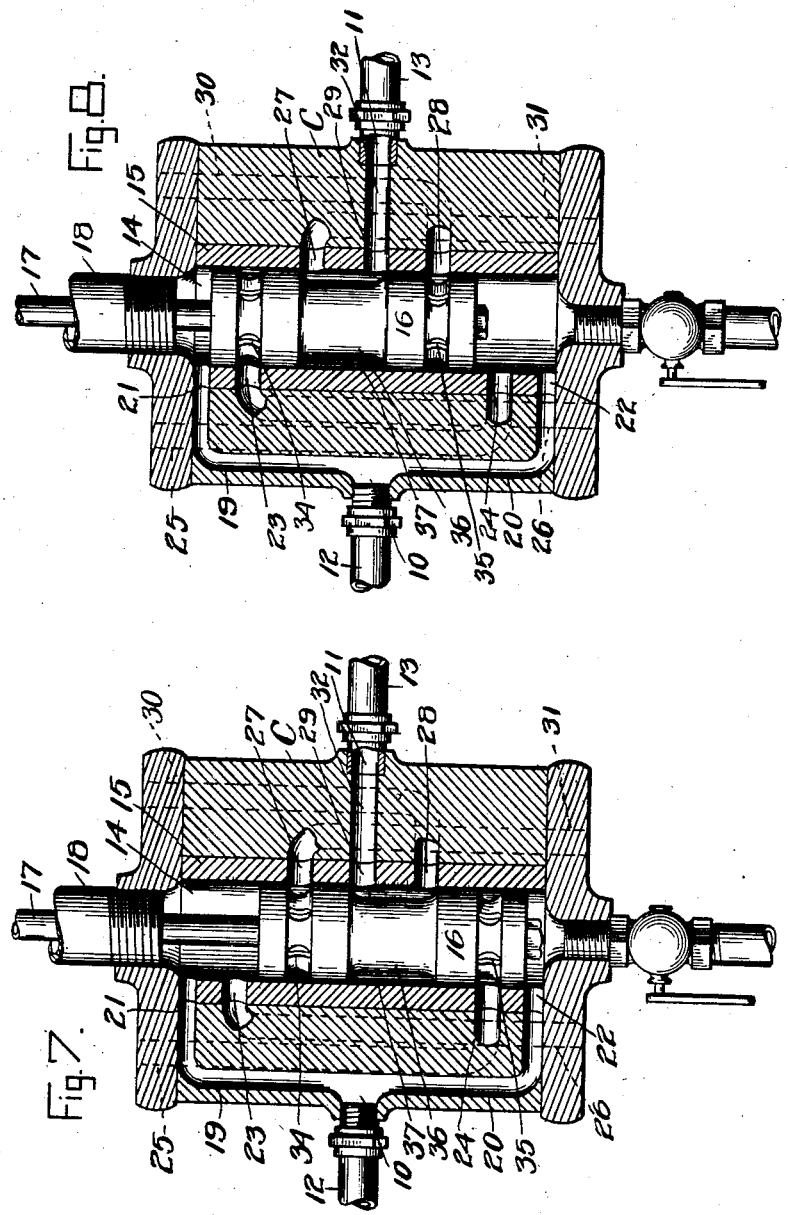

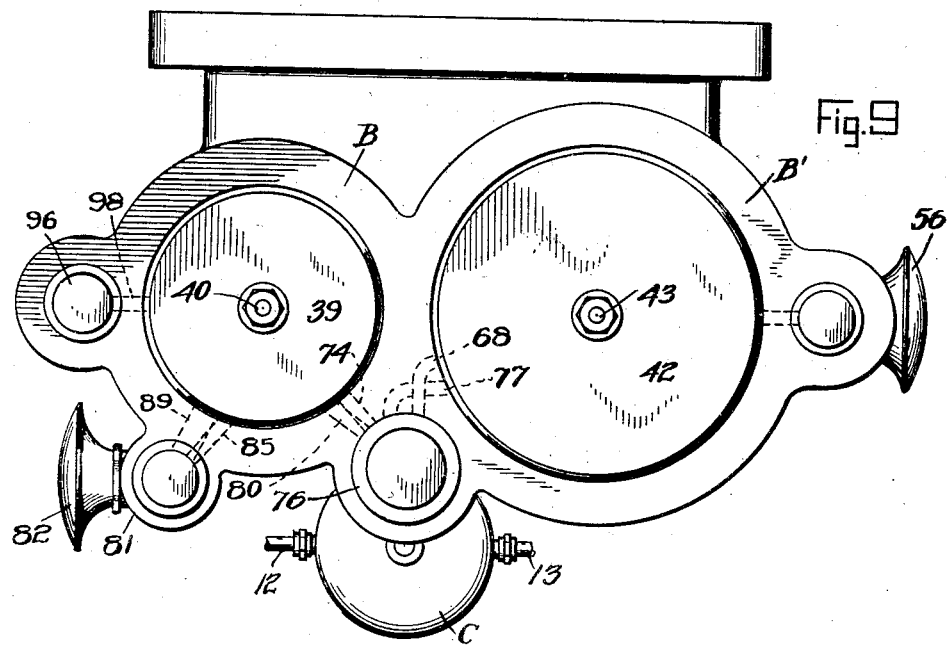
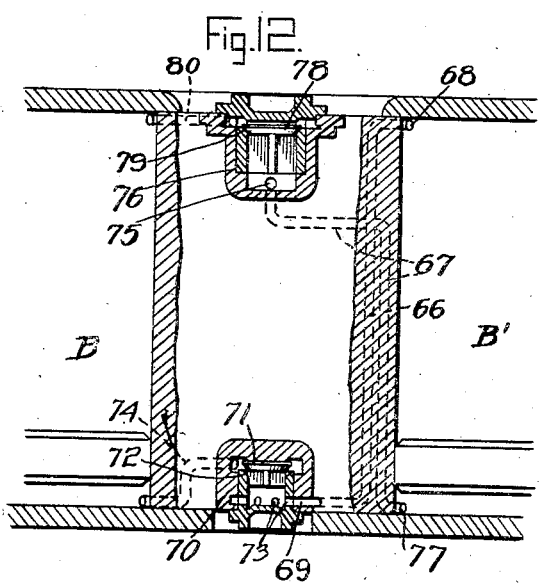

UNITED STATES PATENT OFFICE.

FRANK TUMA, OF BUFFALO, NEW YORK, ASSIGNOR OF ONE-HALF TO JAMES C. CURRIE, OF JERSEY CITY, NEW JERSEY.

COMPOUND PUMP.

1,039,616.  Specification of Letters Patent.  Patented Sept. 24, 1912.

Original application filed March 3, 1910, Serial No. 547,077. Divided and this application filed April 8, 1912. Serial No. 689,262.

*To all whom it may concern:*

Be it known that I, FRANK TUMA, a citizen of the United States, residing at Buffalo, in the county of Erie and State of New York, have invented certain new and useful Improvements in Compound Pumps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The present invention relates to compound compressor or air pumps, and has for its object to provide an improved construction wherein the exhaust of one compression cylinder is utilized in assisting the pressure on the piston of the other cylinder; also wherein the exhaust from one compression cylinder is utilized in alternation from opposite sides of its piston to assist the pressure on the opposite sides of its piston of the other cylinder, in alternation; also in connection with the foregoing to provide valve controlled outlets on opposite sides of the high pressure piston for a portion of its stroke; also to provide the high pressure cylinder with valve controlled outlets at opposite sides of its piston, which valves normally permit some exhaust from both sides of the piston and when the pressure on one side of the valves becomes greater than the difference in pressure between the high and low pressure cylinders the valve on the pressure side of the piston for the time being will be closed and the valve on the compression side of and for exhaust; also to combine with the high and low pressure cylinders, a delivery chamber in valve controlled communication with the compression cylinders to receive the compressed agent from the cylinders; also to provide a construction whereby the pistons in the high and low pressure compression cylinders will be moved in unison and in the same direction; also to provide other novel features coöperating to give improved results, as hereinafter particularly described and sought to be clearly defined by the claims, reference being had to the accompanying drawings forming a part hereof, and in which:

Figure 1 is a front elevation of the complete pump; Fig. 2 is a horizontal section taken through the air cylinders and the storage reservoir, on the line 2—2 of Fig. 1; Fig. 3 is a horizontal section taken through the pump directly above the valve chest, on the line 3—3 of Fig. 1; Fig. 4 is a horizontal section taken through the valve chest and the steam cylinders, on the line 4—4 of Fig. 1; Fig. 5 is a vertical section taken through the entire pump; Fig. 6 is an enlarged side elevation of the valve; Figs. 7 and 8 are enlarged vertical sections taken through the valve chest on the line 7—7 of Fig. 3, showing the two positions of the valve; Fig. 9 is a plan view of the air cylinder, with the upper head removed; Figs. 10 and 11 are vertical sections taken on the lines 10—10 and 11—11 of Fig. 5; Fig. 12 is a diagrammatic sectional view showing the arrangement of the passages between the two air cylinders.

Reference being had to the drawings, and to the characters marked thereon, A indicates in a general manner the high pressure steam cylinder, A' the low pressure steam cylinder, B the high pressure air cylinder, B' the low pressure air cylinder, and C the valve chest. The various cylinders aforementioned may be of any preferred construction and may be connected together in any suitable manner. Their arrangement is such that the high and low pressure air cylinders are in alinement with the corresponding steam cylinders. The body of the valve chest C may either be integral with or constructed separately from and rigidly attached to the casting which constitutes the body of the steam cylinders. Said chest is arranged in front of the cylinders last referred to.

In the construction shown, chest C is of cylindrical formation (though this is not essential), and its wall or body is formed with inlet and outlet ports 10 and 11 respectively. The former port has fitted therein one end of a pipe 12 which leads thereto from any suitable source of steam supply, as for instance, the boiler of a locomotive, if the pump be utilized in that connection; the outlet opening receives one end of an exhaust pipe 13 leading to any preferred point. Within the central bore 14 of the chest there is preferably arranged a vertical metal shell 15 of cylindrical shape, within which, in turn works the reversing valve 16. Said valve is carried by a rod 17, a portion of which projects through a packed bearing sleeve 18 fitted in the head of the valve chest and is connected with the reversing mechanism hereinafter described.

Between the valve shell and the inlet port of the chest there is formed in said chest a pair of oppositely-extending passages 19 and 20 which open at their adjacent ends into the aforementioned port 10, and at their other ends into ports 21 and 22 formed respectively in the opposite ends of the shell and opening into the interior of the same. Adjacent to said ports there is formed a second pair of ports 23 and 24 with which communicate, respectively, passages 25 and 26 formed partly in the valve chest and partly in the wall of the high pressure steam cylinder A. These passages run parallel with each other, but in opposite directions, and open, respectively into the top and bottom of said cylinder. At the opposite side of shell 15 from the ports 21, 22, 23, and 24, there is formed a series of three ports 27, 28, and 29 arranged above one another. The two end ports 27 and 28 open, respectively, into passages 31 and 30 which, like the passages 25 and 26, run parallel with each other and in opposite directions, and said passages open, in turn into the top and bottom of the low pressure steam cylinder, their formation being the same as that of said passages 25 and 26. The intermediate port 29 opens into a passage 32 which leads directly to the exhaust pipe 13.

The cylindrical reversing valve 16, which works within the interior of the shell 15, is designed to control the passage of the steam through the various ports and passages above specified. It is shown in the present instance as formed with a central interior chamber 33, upper and lower circumferential series of ports 34 and 35 opening therein to and an exteriorly grooved central portion 36 which, when the valve is in place within its shell, results in the formation of an annular passage or chamber 37. Those portions of the valve wherein the ports 34 and 35 are formed, are likewise exteriorly grooved.

The high pressure pistons 38 and 39 work within the corresponding high pressure cylinders A and B and are connected to the ends of a solid piston rod 40, being held in place thereon by suitable fastening devices. In like manner, the low pressure pistons 41 and 42 work in the low pressure cylinders A' and B', and are fastened to the ends of a similar rod 43. Said rods 40 and 43 work through packed bearing sleeves 44 and 45 fastened to the adjacent or inner heads of the steam and air cylinders. The outer heads of said cylinders may be dished or cupped in any preferred manner to prevent the ends of the piston rods from striking thereagainst and to form drain cups having drain cocks as shown. The said inner or adjacent heads of the steam and air cylinders are spaced sufficiently far apart to permit the reversing mechanism, which operates the valve rod 17, to work therebetween.

The courses of the steam, from its entrance into the valve chest, to its final exit therefrom, is as follows; the valve being in the position shown in Figs. 5 and 7; steam from the boiler enters the valve chest through supply pipe 12 and inlet port 10, and passes through the passage 19 and port 21 into the bore 14, whence it passes through port 23 into passage 26, and thence into the high pressure cylinder A, beneath the piston 38 therein, the force of the steam raising said piston, as will be apparent. As the piston reaches the end of its up-stroke it will operate the reversing mechanism hereinafter described, whereupon the valve will be shifted into the position shown in Fig. 8. In this position, port 23 will be closed to the live steam, and port 24 opened, so that the steam will pass through the latter port from passage 20 and port 22, into bore 14, thence by way of port 24 into passage 25, and through said passage into cylinder A, forcing piston 38 downward. During the down-stroke of said piston, the steam previously admitted on the up-stroke will be exhausted through passage 26 and ports 23 and 34, which are at that time in registration, into the chamber 33 in the valve, and thence from said chamber, by way of ports 35 and 28 into passage 30, whence it enters into the low pressure cylinder A' above the piston 41 in said cylinder, which piston has not as yet commenced its operation.

Upon the termination of the down-stroke of the piston, the reversing mechanism will again be operated, this time by the piston 39 in the high pressure air cylinder B, contacting with the stem or rod 49, whereupon the valve will be moved to its first position admitting steam beneath piston 38 as first described. The upward movement of piston 38 will then again take place as previously described, but during such movement, the steam above said piston will be exhausted from cylinder A through passage 25 and ports 24 and 35 into valve chamber 33, and thence by way of ports 34 and 27 and passage 31 into cylinder A' beneath piston 41, which will be caused to ascend by utilizing the exhaust steam thus taken from cylinder A and exerting its pressure on the under face of piston 41. During such ascent, the steam above said piston 41 will be exhausted from cylinder A' by way of passage 30 and port 28 into chamber 37, from which it finally escapes through port 29, passage 32, outlet port 11 and exhaust pipe 13. When the valve is again moved to its second position, as shown in Fig. 8, and live steam is admitted above piston 38 as before, and the piston moves downward, the exhaust from the cylinder A will be into cylinder A' above piston 41, in the course previously described and will force the latter downward, whereupon the steam below said piston 41 will find its final exhaust through passage 31 and port 27 into chamber 37, and thence through port 29 outlet passage 32, port 11 and pipe 13. It will appear therefore, from a consideration of the foregoing, and of Figs. 7 and 8, that when the reversing valve is in its first position, passage 19 and ports 21 and 23 will be open, port 24 will register with the series of ports 35, port 27 will register with the series of ports 35, port 27 will register with the series of ports 34, and ports 28 and 29 will be in communication with chamber 37. When said valve assumes its second position, passage 20 and ports 22 and 24 will be open, port 23 will register with ports 34, port 28 will register with ports 35, and ports 27 and 29 will be in communication with chamber 37. It will also be seen that the pistons 38 and 41 move at the same time and in the same direction, after the operation of the pump has once commenced; that the latter piston is operated entirely by the exhaust from the high pressure cylinder A; and that the movement of said pistons in unison is effected without the aid of a crank or other shaft, there being no mechanical connection of any kind whatever between the two pistons or their rods. Finally, it will be evident that the changes in the courses of the steam are controlled wholly by the reversing valve, which may be operated in any suitable manner.

The mechanism provided in the present instance for effecting the operation of the aforementioned reversing valve may be described as follows: Rod 17, by which said valve is carried, has rigidly secured to its upper end by any preferred retaining means a horizontally-arranged V-shaped member 46. The arms 47 and 48 of this member extend into the space between the adjacent heads of the air and steam cylinders and are provided at their free ends with vertically-arranged rods 49 and 50 suitably secured thereto. The ends of rod 49 work in packed bearing sleeves 51 and 52 set into the adjacent ends of cylinders A and B, while the ends of rod 50 work in similar sleeves 53 and 54 in the ends of cylinders A' and B'. Said rod ends, moreover, lie in the paths of movement of the respective pistons in the several cylinders, so as to admit of their operation by said pistons, their lengths being such that the ends to be struck by the pistons will project an appreciable distance into the corresponding cylinders. Thus, in Fig. 5 the lower ends of said rods are shown as projecting into cylinders A and A', so as to be struck by pistons 38 and 41 when the same reach the limit of their upward movement. On being struck by the pistons specified, said rods themselves will move in the same direction, carrying with them member 46 and rod 17 to which valve 16 is attached, and thereby reversing said valve. At the end of their upward movement, the upper ends of said rods will project into cylinders B and B' in position to be struck and forced downward by pistons 39 and 42 when the same descend. By reason of the construction and arrangement above described, it will be apparent that there is employed what is in effect a double reversing mechanism, the two main members (rods) of which are connected to each other and to the valve rod 17 by the V-shaped member 46, one of said members being operable by the compound high pressure pistons 38—39 and the other member by the similar low pressure pistons 41—42. Consequently, if either member be broken or otherwise injured, only half of the reversing mechanism will be thrown out of operation, since the valve will still be reversed by the other member, which will continue its movements. The same will also be true in the event of injury to any one of the several pistons, or to either piston rod, since the other piston rod will continue to operate.

In the form of the invention illustrated, the construction of the air cylinders B and B' is as follows: Low pressure cylinder B' has its wall formed with an air chamber 55 into which atmospheric air is taken through a strainer nozzle 56. The lower end of this chamber opens into a passage 57 which leads downward and opens into the lower portion of a valve chamber 58 wherein a check valve 59 is arranged, the cylindrical seat 60 in which said valve works being formed with perforations 61. Directly above the valve there is formed a passage 62 opening into the lower end of cylinder B'. At the upper end of the air chamber is arranged a second check valve 63 which works in a seat 64, communication being had at this point with the interior of said cylinder B' through a passage 65. The wall between the high and low pressure cylinders B and B' has formed therein two vertical passages 66 and 67. Passage 66 opens at its upper end through a port 68 into the upper end of cylinder B' and at its lower end through a port 69 into the lower portion of a valve chamber 70 having a check valve 71 located therein and working in a seat 72, the wall of which seat is perforated as at 73 to admit air into the interior thereof. The upper portion of this valve chamber has communicating therewith a port or passage 74 which leads outwardly of said chamber and opens into the lower end of high pressure cylinder B. Passage 67 opens at its upper end through a port 75 into an upper valve chamber 76, and at its lower end through a port 77 into the lower end of low pressure cylinder B'. The upper valve chamber 76 is provided with an interiorly located check valve 78 working in a seat 79, and also with a port 80 leading to cylinder B. Both valve chambers are located between cylinders B and B'. Cylinder B is also provided with an air-intake chamber 81 into which atmospheric air is drawn by the action of piston 39 through a nozzle 82 similar to nozzle 56. In the upper end of the intake chamber there is arranged a valve seat 83 wherein a check valve 84 works, the portion of said chamber above said valve communicating with cylinder B through a port 85. There is formed at the lower end of said intake chamber an offset valve chamber 86 provided with a seat 87 for a check valve 88 and also with a port or passage 89 leading into cylinder B. Finally, there is provided in conjunction with the air cylinders a delivery chamber 90 which communicates by way of a pipe 91 with the main reservoir (not shown). At the upper and lower ends respectively of said delivery chamber are arranged check valves 92 and 93 working in seats 94 and 95 located in valve chambers 96 and 97. Chamber 96 communicates with the interior of cylinder B by way of a passage 98 which leads from a port 99 in the upper end of said cylinder, and with chamber 90 by a port or passage 100. The upper portion of chamber 97 communicates with said chamber 90 by way of a passage 101, and the lower portion thereof with the lower portion of cylinder B by way of a port 102. The various check valves specified above may be of any preferred type, and in the present construction they are shown as normally closed, and as arranged for upward movement. Suitable retaining and adjusting devices are employed in connection with said valves.

The action of the air on being taken into the cylinders B' and B through the nozzles 56 and 82 is as follows, it being assumed that pistons 42 and 39 are in the position shown in Fig. 5 i. e., about to start on their upward movement: On the low pressure sides, the upward movement of piston 42 draws air through nozzle 56 into chamber 55, the air passing downward through passage 57 into valve chamber 58, thence it passes through perforations 61 into the interior of seat 60, raising valve 59 and discharging through passage 62 into the lower end of cylinder B'. On the high pressure side, the air drawn through nozzle 82 into chamber 81 by the upward movement of piston 39 will flow into the lower portion of valve chamber 86, raising valve 88 from its seat 87, and through passage 89 into the lower end of cylinder B. When the low pressure piston starts on its down-stroke, the air previously admitted therebeneath will be compressed and will exhaust through port 77 into passage 67, whence it will pass through port 75 into valve chamber 76, raising valve 78 and discharging from said valve chamber through port 80 into the upper portion of cylinder B. The air thus admitted into said cylinder B will escape through port 99 and passage 98 into the interior of valve chamber 96, where it will open valve 92 and flow through passage 100 into the delivery chamber 90. During this movement of piston 42, air will be drawn through nozzle 56 into chamber 55 as before, but will pass into the top part of cylinder B' through passage 65, raising valve 63 on its way toward said passage. On the high pressure side, the air beneath piston 39 will be compressed during the down-stroke thereof and will be exhausted through passage 102 into valve chamber 97, raising valve 93 therein and finally exhausting through passage 101 into chamber 90. At the same time, air will be taken through nozzle 82 and chamber 81 and will open valve 84 and pass through port 85 into cylinder B above the piston. On the succeeding up-stroke of piston 42, the air thereabove will be compressed and exhausted through port 68 into passage 66, flowing downwardly through the latter and discharging through port 69 at the lower end thereof into valve chamber 70. On being admitted thereinto, it will pass through perforations 73 into the interior of seat 72 and will raise valve 71 whereupon it will be free to discharge into the lower portion of cylinder B by way of passage 74 and will flow also by port 102 from cylinder B to the valve chamber containing valve 93 and will lift said valve and flow by passage 101 into the delivery chamber 90 and be discharged therefrom to the main reservoir. Air will also be taken into cylinder B' below piston 42 in the same manner as that already described in connection with the initial up-stroke of said piston. At the same time, the high pressure piston 39 on its up-stroke will compress the air thereabove and exhaust through port 99, and passage 98 into valve chamber 96, and thence through passage 100 into delivery chamber 90, while atmospheric air will be drawn into the lower portion of chamber B as before.

The cycle of operations described will continue until the pressure in the main reservoir becomes greater than the pressure between the high pressure and the low pressure cylinders, and until such period the check valve 93 will remain open on the up stroke of the piston. When however the pressure in the main reservoir becomes greater than the pressure between the high pressure and low pressure cylinders, the check valve 93 will close, and the air exhausted from the low pressure cylinder into the high pressure cylinder beneath the piston of the latter together with the air drawn in through the check valve 88 will exert its pressure on the under side of the high pressure piston 39 so as to assist and increase its efficiency in compressing and forcing the air that is above the high pressure piston from its cylinder through port 99 and passage 98 and past check valve 92 and through port 100 into the delivery chamber 90. On the down-stroke of the pistons 39 and 42, the valves 59 and 71 will be closed while valves 78 and 84 will be opened as well as valves 92 and 93 so long as the pressure in the main reservoir is less than the pressure between the high and the low pressure cylinders thus permitting the air beneath the low pressure piston 42 to be exhausted through passage-way 67 into the valve chamber 76 so as to lift the valve 78 and permit the exhaust to pass into the upper part of the high pressure cylinder and from thence to and through the check valve 92 in the chamber 90 while at the same time air beneath the high pressure piston 39 will exhaust through port 102 and valve 95 into the chamber 90. When however on the down-stroke the pressure in the main reservoir becomes greater than the pressure between the high pressure and the low pressure cylinders, the check valve 92 will be closed thereby and the air drawn into the upper part of the high pressure cylinder through the intake chamber 81 together with that exhausted from the low pressure cylinder will exert its pressure on the top of the high pressure piston and thus assist it in completing its stroke.

The operation of the entire apparatus is thought to be apparent from the foregoing, and further description is accordingly omitted. It may be stated, however, that the cylinders A and A′ are obviously the motor cylinders, since the pump is primarily operated by means of the pistons in said cylinders, and also that the cylinders B and B′ are for equally obvious reasons the compressor cylinders. It may also be stated that while the apparatus is susceptible of use in various connections, it is designed primarily for attachment to locomotives.

This is filed as a division of my application filed March 3, 1910, Serial No. 547,077.

Having described my invention and set forth its merits what I claim is:—

1. In an apparatus of the class specified, the combination, with high and low pressure compression cylinders in communication with each other and provided each with a fluid intake, of a delivery chamber in valve-controlled port communication with said cylinders, a piston working in each cylinder for compressing the fluid contained therein and discharging the same simultaneously from both cylinders into said delivery chamber when the controlling valves are open, and for discharging the compressed fluid from one cylinder into the other cylinder to exert its energy on the piston in said other cylinder, and means for operating said pistons.

2. In an apparatus of the class specified, the combination, with high and low pressure compression cylinders having communicating valve-controlled passages leading from the top of each cylinder to the bottom of the other cylinder, of a delivery chamber in valve-controlled port communication with said cylinders, a piston working in each cylinder for compressing the fluid contained therein and discharging the same simultaneously from both cylinders into said delivery chamber and for discharging the compressed fluid from one cylinder into the other cylinder to exert its energy on the piston in said other chamber, and means for operating said pistons.

3. In an apparatus of the class specified, the combination of high and low pressure cylinders each having an intake chamber provided with an inlet and with valve-controlled ports opening into the opposite ends of the adjacent cylinder, a delivery chamber in valve-controlled port communication with said cylinders, a piston working in each cylinder for compressing the fluid contained therein and discharging it simultaneously from both chambers into said delivery chamber, and means for operating said piston.

4. In an apparatus of the class specified, the combination, with high and low pressure compression cylinders provided each with a valve-controlled passage leading from the top thereof to the bottom of the other cylinder, and with an intake, of a delivery chamber in valve-controlled port communication with said cylinders, a piston working in each cylinder for compressing the fluid contained therein and delivering it simultaneously from said cylinders into said delivery chamber, and means for operating said pistons.

5. In an apparatus of the class specified, the combination with high and low pressure compression cylinders provided each with an intake, of a delivery chamber communicating with said cylinders, a piston working in each cylinder for compressing the fluid contained therein and discharging it simultaneously from said cylinders into said delivery chamber, and means for operating said pistons in unison and in the same direction.

6. In an apparatus of the class specified, the combination of high and low pressure motor cylinders provided each with a piston, high and low pressure compression cylinders provided each with an intake and with a piston connected to the corresponding motor cylinder piston, a delivery chamber in valve-controlled port communication with said compression cylinders for receiving the fluid compressed therein, means for supplying motive fluid to the high pressure motor cylinder to actuate the piston therein, means for supplying the exhaust from said cylinder to the low pressure motor cylinder to actuate its piston, the motor cylinder pistons being connected to the compression cylinder pistons so that both compression cylinder pistons move in the same direction as both motor cylinder pistons in compressing air simultaneously in both compression cylinders, and means for supplying the fluid compressed within one compression chamber to the other compression chamber, to exert its energy against the piston in said other cylinder.

7. In an apparatus of the class described, the combination of high and low pressure compression cylinders provided each, with an air intake and a piston, both pistons moving in the same direction and each serving to draw air into its own cylinder independent of the other, and the exhaust of the low pressure cylinder being in communication with the pressure side of the high pressure cylinder to utilize the exhaust of one cylinder to assist the pressure on the piston of the other cylinder.

8. In an apparatus of the class described, the combination of high and low pressure compression cylinders provided each with air intake and a piston, both pistons moving in the same direction and each serving to draw air into its own cylinder independent of the other, and the low pressure cylinder on each side of its piston being in valve controlled communication with the high pressure cylinder on each side of its piston to permit exhaust from the low pressure cylinder from opposite sides of its piston, in alternation, to the pressure side of the other cylinder, in alternation.

9. In an apparatus of the class described, the combination of high and low pressure compression cylinders provided each with an intake and a piston, the exhaust of the low pressure cylinder being in communication with the pressure side of the high pressure cylinder, and the high pressure cylinder having a valve controlled outlet on its pressure side for escape of a portion of the compressing agent on the compression stroke of its piston.

10. In an apparatus of the class described, the combination of high and low pressure compression cylinders provided each with intake and a piston, the low pressure cylinder on each side of its piston being in valved controlled communication with the high pressure cylinder on each side of its piston, in alternation, to permit exhaust from the low pressure cylinder from opposite sides of its piston, in alternation, to the pressure side of the other cylinder, and the high pressure cylinder having valve controlled outlets, on opposite sides of its piston, for escape of a portion of the compressing agent on the pressure side on the compression stroke of the piston.

11. In an apparatus of the class described, the combination of high and low pressure compression cylinders provided each with an intake and a piston, the low pressure cylinder on each side of its piston being in valved controlled communication with the high pressure cylinder on each side of its piston, in alternation, to permit exhaust from the low pressure cylinder from opposite sides of its piston, in alternation, to the pressure side of the other cylinder, the high pressure cylinder having outlets at opposite sides of its piston, and valves controlling said outlets, said valves normally permitting some exhaust from both sides of the piston and when the pressure on one side of the valves becomes greater than the difference in pressure between the two cylinders the valve on the pressure side of the piston is closed and the valve on the compression side is opened for exhaust.

In testimony whereof I affix my signature in presence of two witnesses.

FRANK TUMA.

Witnesses:
FRED A. PISKE,
THEODORE KLEIN.